United States Patent [19]

Suzuki

[11] Patent Number: 5,729,727
[45] Date of Patent: Mar. 17, 1998

[54] PIPELINED PROCESSOR WHICH REDUCES BRANCH INSTRUCTION INTERLOCKS BY COMPENSATING FOR MISALIGNED BRANCH INSTRUCTIONS

[75] Inventor: Masato Suzuki, Osaka, Japan

[73] Assignee: Matsushita Electric Industrial Co., Ltd., Osaka-fu, Japan

[21] Appl. No.: 562,069

[22] Filed: Nov. 22, 1995

[30] Foreign Application Priority Data

Dec. 6, 1994 [JP] Japan ................. 6-301828

[51] Int. Cl.⁶ ............................................. G06F 9/38
[52] U.S. Cl. ............................... 395/580; 395/380
[58] Field of Search ........................ 395/383, 580, 395/581, 584, 586, 590, 733, 380

[56] References Cited

U.S. PATENT DOCUMENTS

| | | | |
|---|---|---|---|
| 4,488,227 | 12/1984 | Miu et al. | 395/591 |
| 4,933,841 | 6/1990 | Mori et al. | 395/584 |
| 5,034,880 | 7/1991 | Fong et al. | 395/581 |
| 5,088,030 | 2/1992 | Yoshida | 364/275 |
| 5,148,532 | 9/1992 | Narita et al. | 395/595 |
| 5,526,498 | 6/1996 | Matsuo et al. | 395/586 |

FOREIGN PATENT DOCUMENTS

| | | |
|---|---|---|
| 0402524 | 12/1990 | European Pat. Off. . |
| 55-092947 | 7/1980 | Japan . |
| 57-003142 | 1/1982 | Japan . |
| 5-197546 | 8/1993 | Japan . |
| 7-69803 | 7/1995 | Japan . |

OTHER PUBLICATIONS

"Forced Branching from the Sequencer," IBM Technical Disclosure Bulletin vol. 36, No. 06A, Jun. 1993.
"Performance and the i860 Microprocessor," 8207 IEEE Micro 11 (1991) Oct., No. 5.

*Primary Examiner*—Parshotam S. Lall
*Assistant Examiner*—Viet Vu
*Attorney, Agent, or Firm*—Price, Gess & Ubell

[57] ABSTRACT

A processor for executing branch instructions each including a branch procedure and another procedure includes the following units. A prefetch unit prefetches instructions from memory and updates a prefetch address which is held in the prefetch unit. A control unit controls an execution of the branch procedure and an execution of the other procedure, which follows the execution of the branch procedure. The branch procedure is to write the prefetch address held in the prefetch unit into branch target address. The prefetch unit sequentially prefetches instructions which start at the branch target address when the other procedure is in execution.

15 Claims, 6 Drawing Sheets

FIG. 2

JSR @(disp16,PC)

| ⋮ | ⋮ |
|---|---|
| SP subtraction | SP-4 → SP |
| return address store | PC(bit7-0) → @SP<br>PC(bit15-8) → @(SP+1)<br>PC(bit23-16) → @(SP+2) |
| branch execution | PC+disp16 → PC |
| ⋮ | ⋮ |

| Label | Content | ID |
|---|---|---|
| ADD: | addition(end) | 211 |
| JSR: | branch | 221 |
|  | SP decrement | 222 |
|  | return address store(end) | 223 |
| MOV: | load(end) | 231 |
|  | ⋮ | 141 |

| | | |
|---|---|---|
| ⋮ | ⋮ | |
| branch execution | PFCP,PFC+disp16+0 or 1 → PCB,IAB<br>PFCP or PFC+0 or 1→STB | 221 |
| stack pointer subtraction | AR3-4 → AR3,OAB | 222 |
| return address store | OAB → Address Bus<br>STB → Data Bus | 223 |
| ⋮ | ⋮ | |

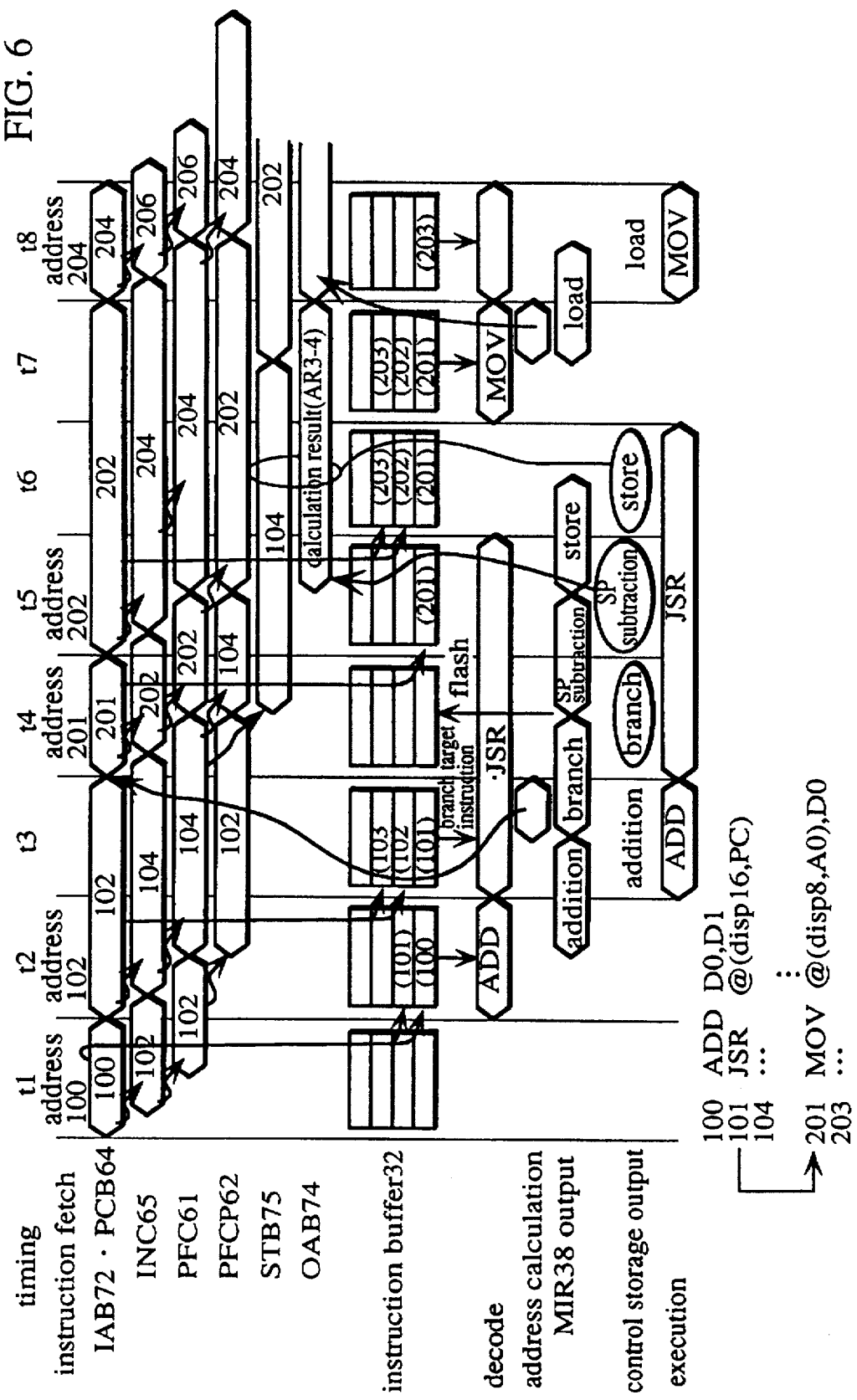

PIPELINED PROCESSOR WHICH REDUCES BRANCH INSTRUCTION INTERLOCKS BY COMPENSATING FOR MISALIGNED BRANCH INSTRUCTIONS

BACKGROUND OF THE INVENTION (1) Field of the Invention

The present invention relates to a pipeline processor, and particularly to a pipeline processor which suffers fewer interlocks caused in branching operations.

(2) Description of the Related Art

As the development of electronic technology, data processing apparatuses such as microprocessors have come to be used in various fields.

Conventional processors are classified into two types: Complex Instruction Set Computers (CISC) that can execute a large number of instructions, and Reduced Instruction Set Computers (RISC) which limit the instruction set, increasing the speed at which the computers can carry out operations. TRON specification chip (TRON means the Realtime Operating system Nucleus) and Motorola's MC68040 belong to the former type, and Sun Microsystems' SPARC and MIPS Technologics, Inc.'s MIPS belong to the latter.

In either type of processors, the pipeline construction contribute to the reduction of the apparent instruction execution time. In pipeline construction, instruction process is divided into at least three stages: instruction fetch, decode, and execution, and multiple instructions are processed at the different stages in parallel.

Unlike RISC processors, most CISC processors deal with variable-length instructions so that program volume can be reduced. On the other hand, many instructions reside across the word boundaries or the doubleword boundaries, so that an instruction decoding operation may start before an instruction fetch operation is completed. This forces the pipeline processing to be temporarily suspended. The temporary suspension of pipeline processing is referred to as pipeline interlock, and the state that an instruction is aligned across the boundaries is referred to as instruction misalignment.

One of such conventional processors is disclosed in Japanese Laid-open Patent Application No. 5-197546 which is titled MICROCOMPUTER AND DIVISION CIRCUIT. As described on page 27, columns 51 and 52 of the specification, a JSR (Jump Subroutine), which is so called a subroutine call or a procedure call saves the contents of a program counter before processing a branch operation.

The processor has a 3-stage pipeline consisting of an instruction fetch stage, a decode/address calculation stage, and an execution stage. The processor includes a four-byte instruction buffer where instructions fetched at the instruction fetch stage are stored, and a control storage which stores micro-instructions. The execution of each instruction is divided into multiple procedures, each corresponding to a micro-instruction.

At the instruction fetch stage, instructions assigned to even-numbered addresses are fetched at the rate of 2 bytes per machine cycle and those assigned to odd-numbered addresses are fetched at the rate of 1 byte per machine cycle. These instructions fetched are stored in the instruction buffer.

At the decode/address calculation stage, a micro-instruction corresponding to the instruction which has been least-latest stored in the instruction buffer is read from the control storage, and a control signal directed by the micro-instruction is outputted. In the case where an instruction consisting of more than one procedure decoded, control signals are outputted one by one in every machine cycle.

At the execution stage, micro-instructions outputted from the control storage are executed at the rate of one per machine cycle.

FIG. 1 shows the timing diagram of the conventional processor which demonstrates how instructions are processed at each stage in each machine cycle, the contents of the instruction buffer, and the micro-instructions outputted from the control storage per procedure.

The program shown in FIG. 1 is as follows:

<instruction 1> address 100: ADD D0, D1

The instruction 1 is a 1-byte instruction consisting of one micro-instruction. The instruction 1 indicates that a value of D0 register and a value of D1 register are added and the results of the add is stored in the D1 register.

<instruction 2> address 101, JSR @ (disp16, PC)

The instruction 2 is a 3-byte instruction consisting of three micro-instructions. The instruction 2 branches off to a subroutine assigned to the address which is obtained by adding a 16-bit displacement to the value of the program counter. The address is referred to as address 201.

<instruction 3> address 201, MOV @ (disp8, A0), D0

The instruction 3 is a 2-byte instruction consisting of one micro-instruction. The instruction 3 loads data in the address which is obtained by adding a 8-bit displacement to the value of the A0 register to the D0 register.

In this program, the 3-byte JSR instruction (instruction 2) and the 2-byte MOV instruction (instruction 3) start at an odd-numbered address, which indicates the occurrence of misalignment.

FIG. 2 shows the contents of operations of the three micro-instructions of the instruction 2 (JSR @ (disp16, PC). The JSR instruction consists of a stack pointer subtraction, a return address store, and a branch. In the diagram, SP, PC, and disp16 represent stack pointer, program counter, and 16-bit address displacement, respectively. These operations are respectively executed in the timings t4, t5, and t6 shown in FIG. 1.

Operations of the conventional processor are as follows.

<timing t1>

At the instruction fetch stage, a 2-byte instruction code is fetched from the addresses 100 and 101.

<timing t2>

The instruction code with the addresses 100 and 101 fetched in the timing t1 is stored in the instruction buffer, while the instruction 1 corresponding to the address 100 is taken from the bottom of the instruction buffer and decoded at the decode/address calculation stage. Since the instruction 1 is 1-byte long, the entire bits of the instruction 1 are in the instruction buffer. The instruction fetch stage calculates a 2-incremented address and fetches a 2-byte instruction code from the addresses 102 and 103.

<timing t3>

The decode/address calculation stage outputs a direction for addition of the instruction 1 and the execution stage executes the addition. Since the instruction 1 consists of a single micro-instruction, this is the completion of the execution of the instruction 1. The instruction code with the addresses 102 and 103 fetched in the timing t2 is stored in the instruction buffer while the instruction 2 corresponding to the address 101 is taken from the bottom of the instruction buffer. The entire bits of the instruction 2, which is 3-byte long are in the instruction buffer. The instruction fetch stage fetches no instruction because 2-byte vacancy is not available in the instruction buffer.

<timing t4>

The decode/address calculation stage outputs a direction for stack pointer decrement, which is the first procedure of the instruction 2. The execution stage executes the stack pointer decrement. The instruction fetch stage calculates a 2-incremented address and fetches a 2-byte instruction code from the addresses 104 and 105.

<timing t5>

The decode/address calculation stage outputs a direction for return address store, which is the second procedure of the instruction 2. The execution stage executes the return address store. The instruction code with the addresses 104 and 105 fetched in the timing t4 is stored in the instruction buffer. The instruction fetch stage calculates a 2-incremented address and fetches a 2-byte instruction code from the addresses 106 and 107.

<timing t6>

The decode/address calculation stage outputs a direction for a branch, which is the third procedure of the instruction 2. The execution stage flashes all the instructions stored in the instruction buffer. The instruction fetch stage receives a branch target address calculated at the decode/address calculation stage and fetches a 1-byte instruction code from the address 201. Only a 1-byte instruction code is fetched because the received address is odd-numbered. The execution of the instruction 2 has been completed.

<timing t7>

The instruction code with the address 201 fetched in the timing t7 is stored in the instruction buffer. The decode/address calculation stage tries to take the instruction 3 corresponding to the address 201 from the bottom of the instruction buffer and to decode it; however, the 2-byte long instruction 3 cannot be decoded because its last 1-byte does not in the instruction buffer. Therefore, the operation of the decode/address calculation is suspended (pipeline interlock). Since the instruction fetched in the timing t6 is assigned to an odd-numbered address, the instruction fetch stage calculates a 1-incremented address and fetches a 2-byte instruction code from the address 202.

<timing t8>

Since the operation at the decode/address calculation stage has been suspended (pipeline interlock) in the timing t7, the operation of the execution stage is suspended (pipeline interlock) in the timing t8. The instruction code with the addresses 202 and 203 fetched in the timing t7 is stored in the instruction buffer. The instruction 3 corresponding to the address 201 is taken from the bottom of the instruction buffer. The decode/address calculation stage decodes the instruction 3 and calculates the address to be loaded. The entire bits of the 2-byte instruction 3 are now in the instruction buffer. The instruction fetch stage fetches no instruction because 2-byte vacancy is not available in the instruction buffer.

<timing 9>

The decode/address calculation stage outputs a direction for loading of the instruction 3, and the execution stage executes the loading. Since the instruction 3 consists of a single micro-instruction, this is the completion of the execution of the instruction 3. The instruction fetch stage calculates a 2-incremented address and fetches a 2-byte instruction code from the addresses 204 and 205.

The conventional processor has a following drawback. An instruction which follows a branch instruction is hereinafter referred to as a branch target instruction.

If a branch target instruction consisting of multiple procedures (micro-instructions) is mis-aligned in a variable-length instruction format, a pipeline interlock is caused by the mis-alignment. This is because a procedure for a branch operation is executed in the final machine cycle. This leads to the extension of the execution time of the entire instructions, and further to the deterioration of the performance of the processor.

To be more specific, in the timing t7 shown in FIG. 1, the instruction 3 cannot be taken from the bottom of the instruction buffer and be decoded because the last 1 byte of the instruction 3 does not exist in the instruction buffer. This is because the instruction 3, which is 2-byte long, is assigned to the odd-numbered address 201, and the branch target instruction is fetched in the previous timing t6.

Another drawback of the processor is that power is wasted for fetching instructions which are supposed to be flashed without being executed in the timings t4 or t5.

Furthermore, if a wait cycle is inserted before an instruction is fetched, an unnecessary instruction fetch must be carried out, thereby reducing the processor performance.

SUMMARY OF THE INVENTION

The object of the present invention is to provide a pipeline processor which suffers fewer pipeline interlocks to be caused by the absence of an instruction to be fetched when an instruction to be executed consists of a micro-instruction for a branch operation and at least another micro-instruction, even if the branch target instruction is in the state of mis-alignment, thereby preventing expansion of the instruction execution time and deterioration of its processing performance.

The object can be achieved by a processor which executes branch instructions each including a branch procedure and another procedure, and includes the following units: A prefetch unit prefetches instructions from memory and updates a prefetch address which is held in the prefetch unit. A control unit controls an execution of the branch procedure and an execution of the other procedure, which follows the execution of the branch procedure. The branch procedure is to write the prefetch address held in the prefetch unit into branch target address. The prefetch unit sequentially prefetches instructions which start at the branch target address when the other procedure is in execution.

As the effects of the above-explained construction, no pipeline interlock is caused even if the branch target instruction is in the state of mis-alignment, and as a result, there is no expansion of the instruction execution time or deterioration of its processing performance.

The effects can work on subroutine instructions if the control unit controls setting of the branch target address obtained based on operands of the subroutine call instructions to the prefetch unit in the execution of the branch procedure, and further controls saving of return addresses to a stack area in the memory in the execution of the other procedure.

The effects can work on instructions which branch to interrupt routines if the control unit controls setting of start addresses of predetermined interrupt routines to the prefetch unit in the execution of the branch procedure, and further controls saving of the return addresses to the stack area in the memory in the execution of the other procedure, and if an interrupt reception unit for receiving interrupt requests from external or internal I/O devices is provided.

When the interrupt reception unit has received an interrupt request, the control unit may control setting of start addresses of interrupt routines corresponding to the interrupt request received to the prefetch unit, and may further control saving of a return address to the stack area.

The object can work on return instructions from interrupt routines if the branch instructions include a first return instruction which indicates a return from a subroutine and a second return instruction which indicates a return from an interrupt subroutine, and if the control unit controls setting of return addresses to the prefetch unit in the execution of the branch procedure.

Each of the interrupt requests may consist of a seventh micro-instruction, an eighth micro-instruction, and a ninth micro-instruction. When the interrupt reception unit has received an interrupt request, the micro-instruction issue unit may sequentially issue control signals corresponding to the seventh micro-instruction, which directs that start addresses of interrupt routines corresponding to interrupt requests be stored in the first address latch, the eighth micro-instruction, which directs that the stack pointer be updated, and the ninth sixth micro-instruction which directs that return addresses obtained from the second address latch be saved in the stack area.

The prefetch unit may include a program counter unit which sequentially updates fetch addresses, and includes a first address latch and an incrementor which are interconnected in a loop, and further include a second address latch for holding contents of the first address latch. The control unit may include the following units: An address calculation unit for calculating branch target addresses of subroutine call instructions by pre-decoding the subroutine call instructions. A control storage unit for storing a plurality of micro-instructions which execute the branch instructions. A micro-instruction issue unit for sequentially reading microinstructions which correspond to the branch procedure and the other procedure, and issuing control signals directed by the micro-instructions which have been read within the processor. Each of the subroutine call instructions may consist of a first micro-instruction, a second microinstruction, and a third micro-instruction. The microinstruction issue unit may sequentially issue control signals corresponding to the first micro-instruction, the second micro-instruction, and the third micro-instruction. The first micro-instruction directs that the branch target addresses obtained by the address calculation unit be stored in the first address latch, and return addresses based on contents of the second address latch be stored in a store buffer which supplies the memory with data, the second micro-instruction directs that the stack pointer be updated, and contents of the stack pointer updated be stored in an address buffer which supplies the memory with addresses, and the third microinstruction directs that contents of the store buffer be stored in a stack area designated by the address buffer.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 shows the construction of control storage in the conventional processor.

FIG. 6 shows the timing diagram of the processor 10.

DESCRIPTION OF THE PREFERRED EMBODIMENT

Figure 1:
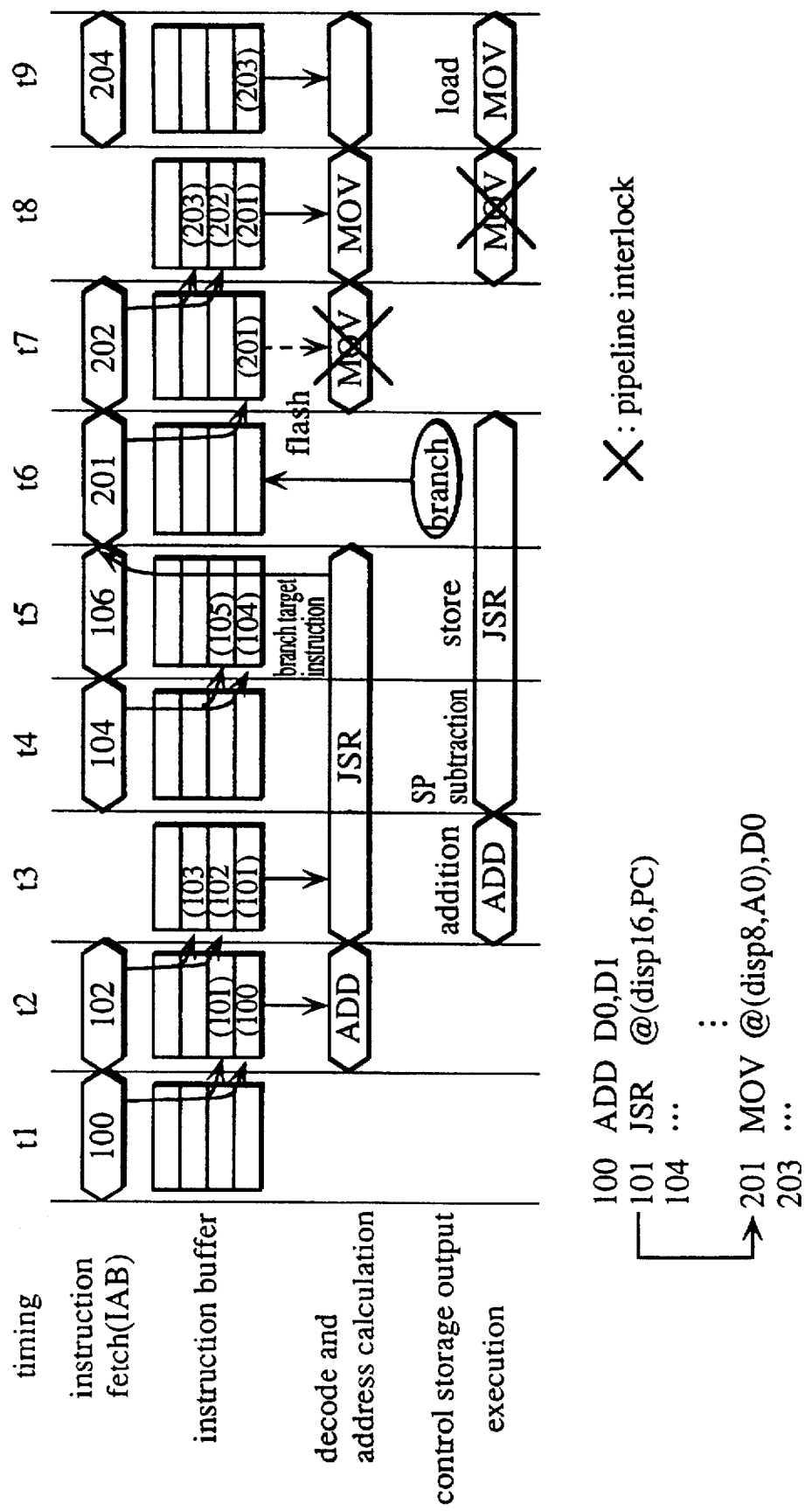
FIG 1 shows the timing diagram of the conventional processor.
Figure 3:
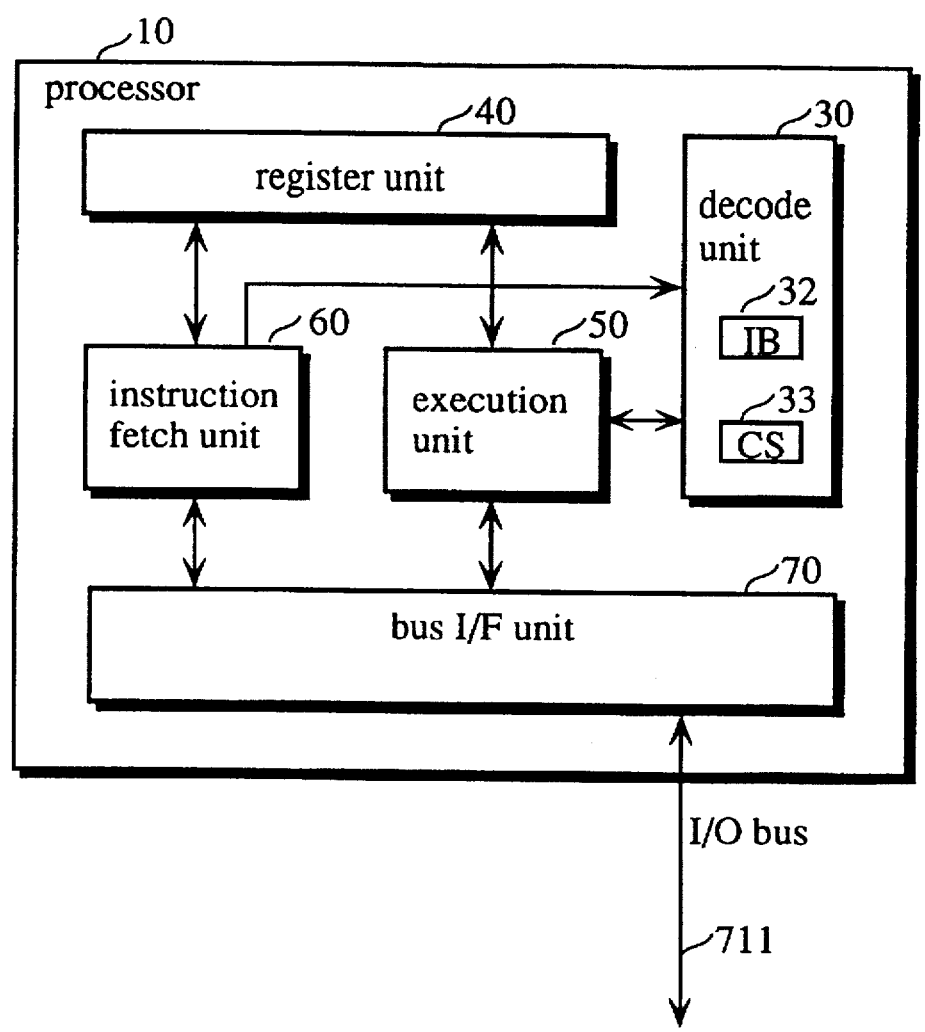
FIG. 3 shows the brief construction of the processor of the present embodiment.

FIG. 3 shows the brief construction of the processor 10 of the present embodiment.

The processor 10 includes a decode unit 30, a register unit 40, an execution unit 50, an instruction fetch unit 60, and a bus I/F unit 70. The decode unit 30 includes an instruction buffer 82 and a control storage unit 33. The instruction fetch stage of the instruction fetch unit 60, the decode stage of the decode unit 30, and the execution stage of the execution unit 50 operate concurrently as pipeline.

An I/O bus 711 carries data between the processor 10 and unillustrated external memory which stores programs or data, for example.

The bus I/F unit 70 controls the I/O bus 711.

The instruction fetch unit 60 fetches instructions from the external memory via the bus I/F unit 70. If the instruction address sequence is discontinuous after a branch instruction has been executed, the instruction fetch unit 60 receives instruction addresses which have been calculated at either the decode stage or the execution stage. On the other hand, the instruction address sequence is continuous, they are calculated in the increment circuit included in the instruction fetch unit 60 to fetch instructions therefrom. Instructions assigned even-numbered addresses are fetched at the rate of 2 bytes per machine cycle, and those assigned odd-numbered addresses are fetched at the rate of 1 byte per machine cycle. These instructions fetched are stored in the 4-byte instruction buffer 32.

The decode unit 30 receives instructions from the instruction fetch unit 60 and decode them. When a decoded instruction involves memory access, the decode unit 30 makes the execution unit 50 calculate the operand address thereof. When a decoded instruction involves a branch, the decode unit 30 makes the execution unit 50 calculate the branch target address thereof.

The control storage 33 of the decode unit 30 issues one micro-instruction when a decoded instruction consists of a single micro-instruction. When the instruction consists of multiple micro-instructions, the instructions are sequentially issued at the rate of one per machine cycle.

The register unit 40 includes multiple registers which are designated with instruction operands.

The execution unit 50 includes a calculator to perform arithmetic logical calculation and receives the micro-instructions from the control storage 33 and executes them at the rate of one per machine cycle.

Figures 4A, 4B:
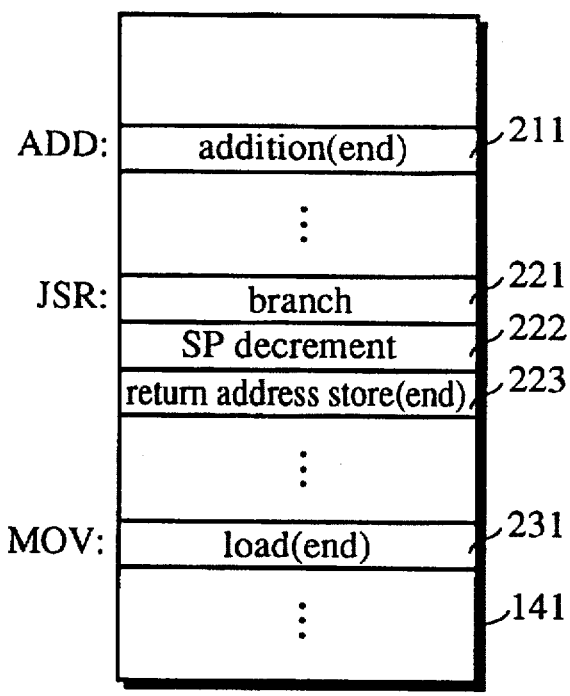
FIG. 4A shows the construction of the control storage 33.
FIG. 4B shows a detailed operation of the control storage 33.

FIG. 4A shows the construction of the control storage 33. The control storage 33 stores micro-instructions corresponding to all machine language instructions.

In the construction, a storage area 211 stores a micro-instruction to be issued and referred to when the instruction 1 (add instruction) has been decoded. The instruction 1 involves only issuing the micro-instruction stored in the storage area 211 in one machine cycle.

Each of the control storage areas 221, 222, and 223 stores a micro-instruction to be issued and referred to when the instruction 2 (JSR instruction) has been decoded. These control storage areas 221–223 indicate three micro-instructions for branch, stack pointer decrement, and return address store, respectively. The instruction 2 involves issuing the three micro-instructions stored in the control storage areas 211–223 in three consecutive machine cycles.

Another control storage area 231 stores a micro-instruction for load which is issued and referred to when the instruction 3 (MOV instruction) has been decoded. The instruction 3 involves issuing the micro-instruction stored in the control storage area 231 in one machine cycle.

Figure 5:
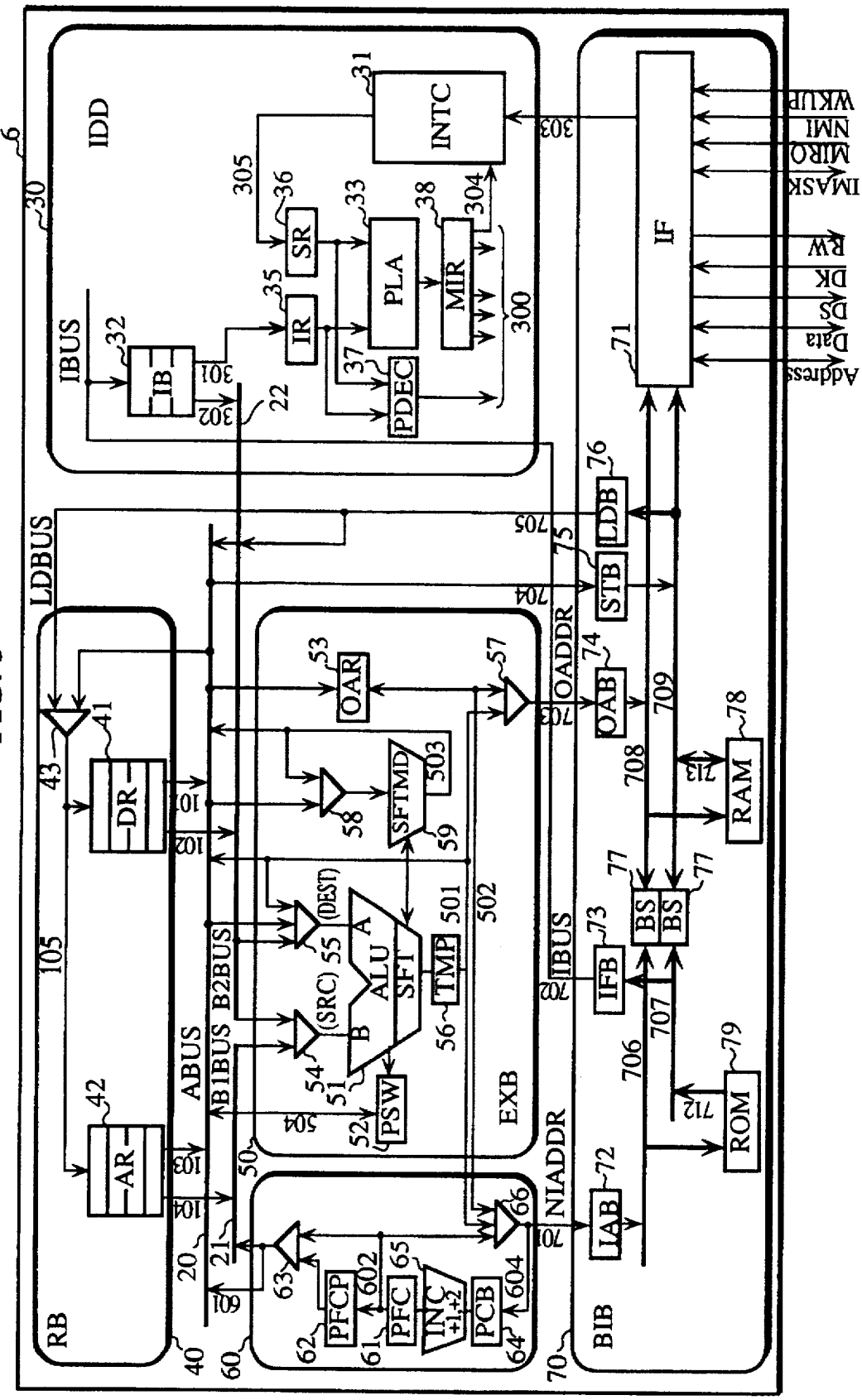
FIG. 5 shows a more detailed construction of the processor of the present embodiment.

FIG. 5 shows a more detailed construction of the processor 10 which includes a bus 20 (hereinafter ABUS 20), a first data bus 21 (hereinafter B1BUS 21), a second data bus 22 (hereinafter B2BUS 22), an instruction address bus 701 (hereinafter NIADDR 701), an instruction bus 702 (hereinafter IBUS 702), an operand address bus 703 (hereinafter OADDR 703), a store data bus 704 (hereinafter STBUS 704), and a load data bus 705 (hereinafter LDBUS 705).

In addition to the instruction buffer 32 and the control storage 33, the decode unit 30 includes an interrupt control unit 31, an instruction register 35, a status register 36, a pre-decoder 37, and a micro-instruction register 38.

The interrupt control unit 31 controls operational sequence of the processor 10 when an interrupt has been received.

The instruction buffer 32 stores instructions fetched from memory by the instruction fetch unit 60 prior to instruction execution. In the present embodiment, the instruction buffer 32 has a capacity of 4-byte instructions.

The instruction register 35 receives instructions from the bottom of the instruction buffer 32 and holds them.

The status register 36 holds various kinds of status flags which are necessary to decode instructions.

The control storage 33 refers to the contents of the status register 36 and decodes the instructions held in the instruction register 35. In the present embodiment, control logic is achieved by using a programmable logic array (PLA), and the control storage 33 sequentially outputs micro-instructions to execute the instructions in the instruction register 35.

The pre-decoder 37 receives instructions from the instruction register 35 and data from the status register 36, and outputs a control signal to execute a load instruction in one machine cycle and a branch instruction. The instruction reception and the control signal output are done at the decode stage prior to the execution stage. In the case of branch instructions such as subroutine call instructions and interrupt instructions, the pre-decoder 37 controls to store the branch target address designated in a branch instruction to a program counter buffer 64 (hereinafter PCB 64) and an instruction address buffer 72 (hereinafter IAB 72). In the case where the branch target address is designated by a displacement, the pre-decoder 37 makes the execution unit 50 calculate the branch target address and store the outcome in the PCB 64 and the IAB 72.

The micro-instruction register 38 holds the instructions which have been decoded by the control storage 33.

The register unit 40, which holds data or addresses, is composed of a data register group 41, an address register group 42, and a selector 43. The data register group 41 includes four 24-bit registers DR3–DR0, and the address register group 42 includes four 24-bit registers AR3–AR0. The register AR3 works as a stack pointer.

The selector 43 selectively outputs data either to the data register group 41 or the address register group 42 through the ABUS20 or the LDBUS 705.

The execution unit 50, which calculates address or data, is composed of a calculator 51, a program status word 52 (hereinafter PSW 52), an operand address register 53 (hereinafter OAR 53), selectors 54 and 55, a temporary register 56 (hereinafter TMP 56), selectors 57 and 58, and a shifter 59 (hereinafter SFTMD 59).

The calculator 51 calculates 24-bit data or addresses.

The PSW 52 is a 16-bit register which holds flags obtained from data calculation.

The OAR 53 stores addresses to access memory.

The selectors 54 and 55 select operands to be inputted to the calculator 51.

The TMP 56 temporarily holds the output of the calculator 51.

The selector 57 selects the output of the TMP 56 or the OAR 53 and sends the selected output to an operand address buffer 74 (hereinafter OAB 74).

The selector 58 selects data of either the ABUS 20 or the shifter 59.

The shifter 59 receives the output of the selector 58 and performs shifting operations with the calculator 51.

The instruction fetch unit 60, which controls instruction fetch positions, is composed of a first prefetch counter 61 (hereinafter PFC 61), a second prefetch counter 62 (hereinafter PFCP 62), a selector 63, the above-mentioned PCB 64, an incrementor 65 (hereinafter INC 65), and a selector 66.

The PCB 64 holds the addresses assigned to the instructions fetched from a selector 66.

The INC 65 increments the addresses held in the PCB 64 by either 1 or 2 and outputs the outcome as the addresses assigned to the instructions to be fetched to the IAB 72 via the PFC 61 and the selector 66.

The PFC 61 holds the addresses incremented by the INC 65.

The PFCP 62 holds the addresses which immediately proceed the addresses held in the PFC 61.

The selector 63 selects addresses from either the PFC 61 or the PFCP 62 and outputs the selected addresses on the ABUS 20 and the B1BUS 21.

The selector 66 selects the output of the PFC 61 when instructions whose addresses are consecutive are fetched, and selects addresses from either the TMP 56 or the OAR 53 when the instructions involve branch, thereby outputting the addresses selected.

The bus I/F unit 70, which controls bus connection to fetch instructions or data from unillustrated external memory, is composed of an I/F unit 71, an instruction address buffer 72, an instruction fetch buffer 73, the OAB 74, a store buffer 75 (hereinafter STB 75), a load buffer 76, two bus switchs 77, a RAM 78, and a ROM 79.

The I/F unit 71 controls connections between a CPU 6 and external memory.

The IAB 72, the instruction fetch buffer 73, the OAB 74, the STB 75, and the load buffer 76 respectively holds instruction addresses, instructions, operand addresses, store data, and load data.

The bus switches 77 connect or disconnect buses 706–708 and 707–709.

The RAM 78 and the ROM 79 store data and instructions, respectively.

FIG. 4B shows a detailed operation in each procedure to execute a machine language instruction, JSR @ (disp16,PC) by using the pre-decoder 37, the control storage 33, and the micro-instruction register 38. As shown in FIG. 4A, the JSR @ (disp16, PC) consists of 3 micro-instructions for branch, stack pointer decrement, and return address store, respectively.

A branch is executed by the operation of the pre-decoder 37: (PFCP or PFC+disp16+0 or 1→PCB, IAB), the operation of the control storage 33, and the micro-instruction register 38: (PFCP or PFC+0 or 1→STB). The pre-decoder 37 makes the branching address: (PFCP or PFC+disp16+0 or 1) be calculated, and the outcome be written to the PCB 64 and the IAB 72. The branch target addresses are obtained by adding an address of either the PFC 61 or the PFCP 62 with a 16-bit displacement and 0 or 1. The selection between the PFC 61 and the PFCP 62 and between 0 and 1 depend on the remaining amount of the instruction buffer 32. With regard to the add of 0 or 1, LSB is set to "1" in the case where 1 is added, because the contents of PFCP is usually an even number (LSB=0).

The outcome of the add is written to the PCB 64 and the IAB 72, and as a result, instructions are sequentially fetched from the branch target addresses. The operation of the control storage 33 and the micro-instruction register 38 makes the STB 75 hold return addresses as a preparation for return address store. This operation is executed by issuing a control signal designated by the micro-instruction in the control storage area 221 from the micro-instruction register 38.

The procedure for the stack pointer subtraction saves a value of the stack pointer to a free area in the stack (AR3−4→AR3, OAB). Since the register AR3 is a stack pointer in the present embodiment, 4 is subtracted from the value of the register AR3. The result of the subtract is also stored in the OAB 74 as a preparation for the return address store. This control is performed by the micro-instruction corresponding to the stack pointer subtraction stored in the control storage area 222.

The procedure for the return address store saves return addresses to a free area in the stack. At this moment, the value of the stack pointer after subtraction and the return addresses are already stored in the OAB 74 and the STB 75, respectively. Therefore, the contents of the STB 75 are stored in the area indicated by the OAB 74. This control is performed by the micro-instruction corresponding to the return address store stored in the control storage area 223.

The processor 10 which is constructed as described hereinbefore operates as follows. In order to clarify the differences from the conventional processor, the same program is used as follows.

<instruction 1> address 100; ADD D0, D1

The instruction 1 is a 1-byte instruction consisting of one micro-instruction. The instruction 1 indicates that a value of D0 register and a value of D1 register are added and the results of the add is stored in the D1 register.

<instruction 2> address 101; JSR @ (disp16, PC)

The instruction 2 is a 3-byte instruction consisting of three micro-instructions. The instruction 2 branches off to a subroutine assigned to the address which is obtained by adding a 16-bit displacement to the value of the program counter. The branch target address is assumed to be address 201.

<instruction 3> address 201; MOV @ (disp8, A0), D0

The instruction 3 is a 2-byte instruction consisting of one micro-instruction. The instruction 3 loads data in the address which is obtained by adding a 8-bit displacement to the value of the A0 register to the D0 register.

FIG. 6 shows the timing diagram of the processor 10. The timing diagram includes instructions to be processed in the instruction fetch unit 60, the decode unit 30, and the execution unit 50, the contents of the instruction buffer 32, and the outputs of the control storage 33 in timings t1–t8 each called a machine cycle.

<timing t1>

The instruction fetch unit 60 fetches a 2-byte instruction code from the addresses 100 and 101. The instruction address is received from either the decode stage or the execution stage because of an unillustrated branch or other reasons. It is assumed that the instruction buffer 32 has no instruction therein.

<timing t2>

The instruction code with the addresses 100 and 101 which has been fetched in the timing t1 is stored in the instruction buffer 32. The instruction 1 corresponding to the address 100 is taken from the bottom of the instruction buffer 32 and decoded by the decode unit 30. Since the instruction 1 is 1-byte long, the entire bits of the instruction 1 are in the instruction buffer 32. The instruction fetch unit 60 calculates a 2-incremented address and fetches a 2-byte instruction code from the addresses 102 and 103.

<timing t3>

The control storage area 211 in the decode unit 30 outputs a direction for addition of the instruction 1 and the execution unit 50 executes the addition. This is the completion of the execution of the instruction 1. The instruction code with the addresses 102 and 103 which has been fetched in the timing t2 is stored in the instruction buffer 32 while the instruction 2 corresponding to the address 101 is taken from the bottom of the instruction buffer 32. The instruction 2 is decoded and the branch target address is calculated by the calculator 51. The entire bits of the instruction 2, which is 3-byte long are in the instruction buffer 32. The instruction fetch unit 60 fetches no instruction because 2-byte vacancy is not available in the instruction buffer 32.

<timing t4>

The control storage area 221 in the decode unit 30 outputs a direction for a branch, which is the first procedure of the instruction 2. All the instructions stored in the instruction buffer 32 are flashed. The instruction fetch unit 60 receives a branch target address calculated at the timing t3 in the decode unit 30 and fetches a 1-byte instruction code from the address 201. Only 1-byte instruction code is fetched because the received address is odd-numbered.

<timing t5>

The control storage area 222 in the decode unit 30 outputs a direction for stack pointer decrement, which is the second procedure of the instruction 2. As shown in FIG. 4B, the execution unit 50 executes the stack pointer decrement. The instruction code with the address 201 which has been fetched in the timing t4 is stored in the instruction buffer 32. The instruction fetch unit 60 calculates a 1-incremented address because the address which has been fetched in timing t4 is odd-numbered, and fetches a 2-byte instruction code from the addresses 202 and 203.

<timing t6>

The control storage area 223 in the decode unit 30 outputs a direction for return address store, which is the third procedure of the instruction 2. As shown in FIG. 4B, the execution unit 50 executes the return address store. The instruction code with the addresses 202 and 203 fetch in the timing t5 is stored in the instruction buffer 32. The instruction fetch unit 60 fetches no instruction because 2-byte vacancy is not available in the instruction buffer 32. The execution of the instruction 2 has been completed.

<timing t7>

The instruction 3 corresponding to the address 201 is taken from the bottom of the instruction buffer 32. The decode unit 30 decodes the instruction 3 and calculates the address to be loaded. The entire bits of the 2-byte instruction 3 are now in the instruction buffer 32, and as a result, no pipeline interlock is caused. The instruction fetch unit 60 fetches no instruction because 2-byte vacancy is not available in the instruction buffer 32.

<timing t8>

The control storage area 231 in the decode unit 30 outputs a direction for load of the instruction 3, and the execution unit 50 executes the load. This is the completion of the execution of the instruction 3. The instruction fetch unit 60 calculates a 2-incremented address and fetches a 2-byte instruction code from the addresses 204 and 205.

As explained hereinbefore, according to the present invention, when an instruction which branches to a subroutine is executed, a direction for branching is outputted from the control storage 33 prior to another direction.

As a result, the instruction fetch unit 60 can fetch a branch target address twice concurrently with the execution of the stack pointer decrement or the return address store in the execution unit 50. Consequently, at the point where a branch target instruction is decoded, 3-byte branch target instructions are stored in the instruction buffer 32 even if the branch target instruction is mis-aligned.

Thus, pipeline interlock due to the absence of instructions in the instruction buffer 32 can be avoided.

Although the present embodiment uses an instruction which branches to a subroutine, any other instructions can be applied as long as they consist of a branch procedure and at least one non-branch procedure. For example, in the case where an instruction is branched to an interrupt routine, the control storage 33 can be designed to issue a direction for branching prior to the stack pointer decrement and the return address store and the status word store. In the case where an instruction which directs to return from a subroutine or from an interrupt routine, the control storage 33 can be designed to issue a direction for branching prior to the load of the return address store and the status word, and the stack pointer increment.

Although the instruction buffer 32 has a capacity of 4 bytes in the present embodiment, it may have a capacity of 5 bytes or larger. The 5-byte or larger capacity is more effective because this means that the instruction buffer 32 has at least 5-byte branch target instructions at the point where the decoding to a branch target instruction of an instruction which branches to a subroutine is started. Furthermore, the capacity of the instruction buffer 32 may be 3 bytes.

Although the maximum instruction length to be fetched by the instruction fetch unit 60 in one machine cycle is 2 bytes in the present embodiment, it may be 4 bytes or larger. The possibility of instruction mis-alignment across the address boundaries decreases as the instruction length to be fetched in one machine cycle gets longer. However, the possibility cannot be zero, however the word length is increased.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A processor for executing branch instructions, each branch instruction including a branch procedure and another procedure, by performing pipeline processing comprising at least three stages including an instruction fetch state, an instruction decode stage, and an instruction execution stage, said other procedure including data transmission or operation, said processor comprising:
  a prefetch means for prefetching instructions from memory and storing the instructions into an instruction buffer, and updating a prefetch address which is held in said prefetch means, if the instruction stored at the address targeted by a branch instruction is situated at an alignment address in the memory, n (n is an integer of 1 or larger) times of memory access being necessary for fetching the branch target instruction, and if the branch target instruction is situated at a misalignment address in the memory, n plus 1 times of memory access being necessary for fetching the branch target instruction;
  an execution means for executing an instruction in the instruction execution stage, and if the instruction includes a plurality of procedures, said execution means sequentially performs the procedures, the period of time required for the instruction execution stage varying depending on the number of procedures;
  a branch means for controlling said execution means so as to first perform said branch procedure when the branch instruction is decoded, said branch procedure including the step of replacing the prefetch address held in said prefetch means with a branch target address; and
  a control means for controlling said execution means so as to perform said other procedure of the branch instructions,
  in accordance with the result of the replacement by said branch means, said prefetch means completing fetching branch target instructions from the memory during said other procedure of the branch instructions.

2. The processor of claim 1, wherein the branch instructions include subroutine call instructions, and
  said branch means controls setting of the branch target address to said prefetch means in the execution of said branch procedure, the branch target address being obtained based on operands of the subroutine call instructions, and
  said control means controls saving of return addresses to a stack area in the memory in the execution of said other procedure.

3. The processor of claim 2, wherein the branch instructions include interrupt calls which branch to interrupt routines,
  said branch means controls setting of start addresses of predetermined interrupt routines to said prefetch means in the execution of said branch process section, and
  said control means controls saving of the return address to the stack area in the memory in the execution of said other procedure.

4. The processor of claim 3, further comprising an interrupt reception means for receiving interrupt requests from external or internal I/O devices,
  wherein when said interrupt reception means has received an interrupt request, said branch means controls setting of start addresses of interrupt routines to said prefetch means, the interrupt routine corresponding to the interrupt request received, and said control means controls saving of a return address to the stack area.

5. The processor claim 1, wherein said branch means controls said execution means so as to execute said branch procedure in the instruction decode stage in executing the branch instruction.

6. The processor of claim 3, wherein said prefetch means comprises:

a program counter unit for sequentially updating fetch addresses, said program counter unit including a first address latch and an incrementor which are interconnected in a loop; and a second address latch for delaying and then holding contents of the first address latch, and said control means comprises:

a control storage unit for storing a plurality of micro-instructions which execute the branch instructions; and a micro-instruction issue unit for sequentially reading from said control storage unit micro-instructions which correspond to said branch procedure and said other procedure, and issuing control signals directed by the micro-instructions which have been read within the processor, wherein each of the subroutine call instructions consists of a first micro-instruction, a second micro-instruction, and a third micro-instruction, said micro-instruction issue unit sequentially issues control signals corresponding to the first micro-instruction, the second micro-instruction, and the third micro-instruction, the first micro-instruction directs that an address obtained based on operands of the subroutine call instruction be stored in the first address latch, the second micro-instruction directs that the instruction buffer be flushed and that a stack pointer be undated, and the third micro-instruction directs that return addresses obtained from the second address latch be saved in the stack area, and said branch means directs that said micro-instruction issue unit first issue the first micro-instruction in the instruction decode stage in executing the branch instruction.

7. The processor of claim 6, wherein the interrupt call which branch to an interrupt routine consists of a fourth micro-instruction, a fifth micro-instruction, and a sixth micro-instruction, said micro-instruction issue unit sequentially issues control signals corresponding to the fourth micro-instruction, the fifth micro-instruction, and the sixth micro-instruction, the fourth micro-instruction directs that the start addresses of the predetermined interrupt routines be stored in the first address latch, the fifth micro-instruction directs that the stack pointer be updated, and the sixth micro-instruction directs that return addresses obtained from the second address latch be saved in the stack area, and said branch means directs that said micro-instruction issue unit first issue the fifth micro-instruction in the instruction decode stage in executing the interrupt call.

8. The processor of claim 7, further comprising an interrupt reception means for receiving interrupt requests from external or internal I/O devices, wherein each of the interrupt requests consists of a seventh micro-instruction, an eighth micro-instruction, and a ninth micro-instruction, when said interrupt reception means has received an interrupt request, said micro-instruction issue unit sequentially issues control signals corresponding to the seventh micro-instruction, the eighth micro-instruction, and the ninth micro-instruction, the seventh micro-instruction directs that start addresses of interrupt routines corresponding to interrupt requests be stored in the first address latch, the eighth micro-instruction directs that the stack pointer be updated, and the ninth micro-instruction directs that return addresses obtained from the second address latch be saved in the stack area, and said branch means directs that said micro-instruction issue unit first issue the seventh micro-instruction.

9. The processor of claim 3, wherein said prefetch means comprises:

a program counter unit for sequentially updating fetch addresses, said program counter unit including a first address latch and an incrementor which are interconnected in a loop; and a second address latch for delaying and then holding contents of the first address latch, said branch means comprises:

an address calculation unit for calculating branch target addresses of subroutine call instructions by pre-decoding the subroutine call instructions, and said control means comprises:

a control storage unit for storing a plurality of micro-instructions which execute the branch instructions; and a micro-instruction issue unit for sequentially reading micro-instructions which correspond to said branch procedure and said other procedure, and issuing control signals directed by the micro-instructions which have been read within the processor, wherein each of the subroutine call instructions consists of a first micro-instruction, a second micro-instruction, and a third micro-instruction, said micro-instruction issue unit sequentially issues control signals corresponding to the first micro-instruction, the second micro-instruction, and the third micro-instruction, the first micro-instruction directs that the branch target addresses obtained by said address calculation unit be stored in the first address latch, and return addresses based on contents of the second address latch be stored in a store buffer which supplied the memory with data, the second micro-instruction directs that the stack pointer be updated, and contents of the stack pointer updated be stored in an address buffer which supplies the memory with addresses, and the third micro-instruction directs that contents of the store buffer be stored in a stack area designated by the address buffer, and said branch means directs that said micro-instruction issue unit first issue the first micro-instruction.

10. The processor of claim 9, wherein each of the subroutine call instructions consists of a fourth micro-instruction, a fifth micro-instruction, and a sixth micro-instruction, said micro-instruction issue unit sequentially issues control signals which correspond to the fourth micro-instruction, the fifth micro-instruction, and the sixth micro-instruction, the fourth micro-instruction directs that the start addresses of the predetermined interrupt routines be stored in the first address latch, and return addresses based on contents of the second address latch be stored in the store buffer, the fifth micro-instruction directs that the stack pointer be updated, and contents of the stack pointer updated be stored in the address buffer, and the sixth micro-instruction directs that contents of the store buffer be stored in a stack area designated by the address buffer, and said branch means directs that said micro-instruction issue unit first issue the fourth micro-instruction.

11. A pipeline processor which executes branch instructions each consisting of a branch operation and a stacking operation, and which includes a first stage for fetching instructions, a second stage for decoding instructions, and a third stage for executing, said pipeline processor comprising:

a prefetch unit for prefetching instructions from memory and storing the instructions one by one in an instruction register, said prefetch unit having a first address latch, a second address latch, and an incrementor, the first address latch and the incrementor being interconnected in a loop to function as a counter and sequentially updating fetch addresses, and the second address latch holding contents of the first address latch;

a pre-decoder for detecting at the second stage that a branch instruction has been stored in the instruction register;

an address calculation unit for calculating branch target addresses at the second stage, based on a detection result of said pre-decoder;

a decode control unit for controlling a decoding operation of a branch instruction at the second stage when the branch instruction has been stored in the instruction register, and further controlling a branch operation which is done first of all in accordance with a decoded result, and a stack operation which is executed after the branch operation, the branch operation being to store branch target addresses calculated by said address calculation unit to the first address latch; and said prefetch unit sequentially prefetching instructions which start at the branch target address while said decode control unit is controlling the stack operation.

12. The pipeline processor of claim 11, wherein the branch instructions include subroutine call instructions, and the stack operation is to save return addresses based on contents of the second address latch to the stack area.

13. The pipeline processor of claim 12, wherein said decode control unit comprises:

a control storage unit for storing a plurality of micro-instructions which execute the branch instructions; and a micro-instruction issue unit for sequentially reading micro-instructions which correspond to said branch procedure and said other procedure, and issuing control signals directed by the micro-instructions which have been read within the processor, wherein each of the subroutine call instructions consists of a first micro-instruction, a second micro-instruction, and a third micro-instruction, said micro-instruction issue unit sequentially issues control signals corresponding to the first micro-instruction, the second micro-instruction, and the third micro-instruction, and the first micro-instruction directs that the branch target addresses obtained by said address calculation unit be stored in the first address latch, and return addresses based on contents of the second address latch be stored in a store buffer which supplies the memory with data, the second micro-instruction directs that the stack pointer be updated, and contents of the stack pointer updated be stored in an address buffer which supplies the memory with addresses, and the third micro-instruction directs that contents of the store buffer be stored in a stack area designated by the address buffer.

14. The pipeline processor of claim 13, wherein each of the subroutine call instructions consists of a fourth micro-instruction, a fifth micro-instruction, and a sixth micro-instruction, said micro-instruction issue unit sequentially issues control signals which correspond to the fourth micro-instruction, the fifth micro-instruction, and the sixth micro-instruction, and the fourth micro-instruction directs that the start addresses of the predetermined interrupt routines be stored in the first address latch, and return addresses based on contents of the second address latch be stored in the store buffer, the fifth micro-instruction directs that the stack pointer be updated, and contents of the stack pointer updated be stored in the address buffer, and the sixth micro-instruction directs that contents of the store buffer be stored in a stack area designated by the address buffer.

15. A processor for executing branch instructions, each branch instruction including a branch procedure and another procedure, by performing pipeline processing comprising at least three stages including an instruction fetch stage, an instruction decode stage, and an instruction execution stage, said other procedure including data transmission or operation, said processing comprising:

a prefetch means for prefetching instructions from memory and storing the instructions into an instruction buffer, and updating a prefetch address which is held in said prefetch means, if the instruction stored at the address targeted by a branch instruction is situated at an alignment address in the memory, n (n is an integer of 1 or larger) times of memory access being necessary for fetching the branch target instruction, and if the branch target instruction is situated at a misalignment address starting from an odd number in the memory, n plus 1 times of memory access being necessary for fetching the branch target instruction;

a decode means for decoding the branch instructions in the instruction decode stage;

a preceding branch means for performing, when said decode means has decoded the branch instruction said branch procedure according to the decode result in the instruction decode stage, said branch procedure including the step of replacing the prefetch address held in said prefetch means with a branch target address; and a control means for controlling said execution means so as to perform said other procedure of the branch instructions, said other procedure including flushing the instruction buffer;

in accordance with the result of the replacement by said preceding branch means, said prefetch means fetching branch target instructions from the memory in the instruction fetch stage in time with the instruction execution stage of the branch instruction, and then storing the branch target instructions into the flushed instruction buffer.

* * * * *